United States Patent

[11] 3,621,183

| [72] | Inventor | Andre Alphonse Chambonnet<br>Arles, France |
|---|---|---|
| [21] | Appl. No. | 16,022 |
| [22] | Filed | Mar. 3, 1970 |
| [45] | Patented | Nov. 16, 1971 |
| [73] | Assignee | La Societe "Constructions Metalliques De Provence, Levallois<br>Hauts de Seine, France |
| [32] | Priorities | Mar. 4, 1969 |
| [33] | | France |
| [31] | | 6906164;<br>Apr. 25, 1969, France, No. 6925374 |

[54] SELF-PROPELLED MACHINE FOR SUPPORTING AN OSCILLATING TOOL
9 Claims, 8 Drawing Figs.

[52] U.S. Cl. .................................................. 219/125 PL,
219/60 R, 228/45, 318/576
[51] Int. Cl. ........................................................ B23k 9/12
[50] Field of Search ........................................... 219/124,
125 R, 125 PL, 73, 76; 228/8, 9, 10, 45; 74/856,
829; 324/37; 318/576

[56] References Cited
UNITED STATES PATENTS

| 3,267,570 | 8/1966 | Winkler | 228/9 X |
| 3,268,708 | 8/1966 | Thomas | 219/125 |
| 3,311,819 | 3/1967 | Miller | 324/37 |
| 3,328,556 | 6/1967 | Nelson et al. | 219/124 X |
| 3,346,807 | 10/1967 | Wood et al. | 219/124 X |
| 3,426,175 | 2/1969 | Hahne | 219/125 |
| 3,480,194 | 11/1969 | Seeloff | 228/9 X |

Primary Examiner—J. V. Truhe
Assistant Examiner—L. A. Schutzman
Attorney—Gregg, Hendricson & Caplan ABSTRACT: Self-propelled machine for supporting a tool which is required to describe a meandering path between the edges of two metal sheets disposed end-to-end, e.g. a welding machine, comprising means for automatically controlling the amplitude of the oscillations of the tool so that it is always equal to the width of the slot between the two sheets.

Inventor
ANDRÉ A. CHAMBONNET

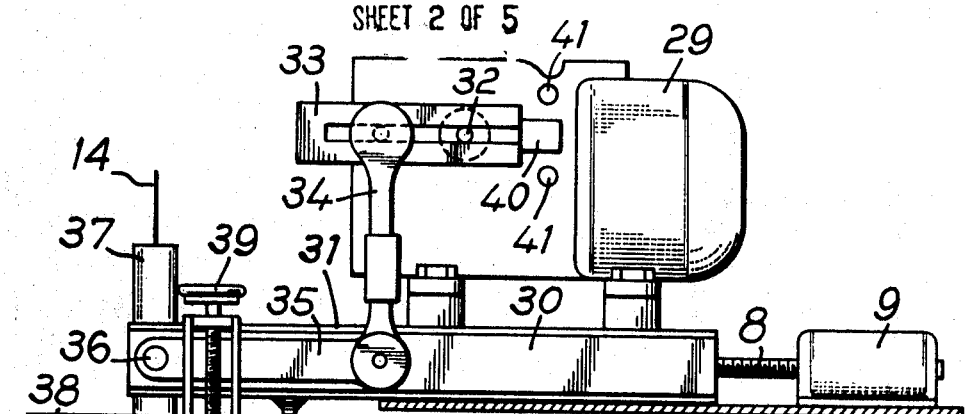
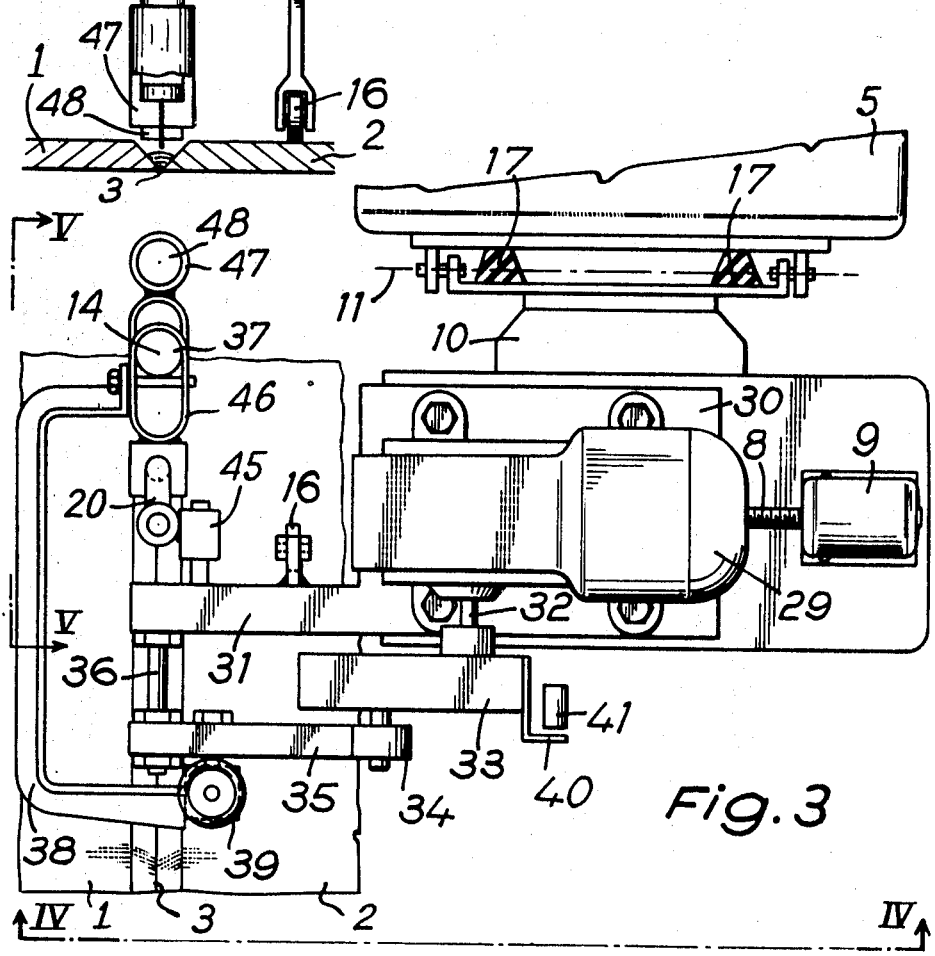
Fig. 4
Fig. 3

PATENTED NOV 16 1971

Inventor
ANDRE' A. CHAMBONNET

By
Attorneys

SELF-PROPELLED MACHINE FOR SUPPORTING AN OSCILLATING TOOL

This invention relates to a machine comprising a carriage self-propelled along a rail and supporting a tool oscillating transversely with respect to the rail. By way of example, a butt-welding machine for metal sheets or large-diameter tubes will be described. This machine comprises a self-propelled carriage which moves along a rail secured to one of the sheets in parallel relationship to the weld. A welding torch, for example, provided with an electrode is mounted on this main carriage.

As the carriage moves along the rail, the torch support is reciprocated in a direction perpendicular to the rail by means of a motor and reduction gear unit and the electrode describes a meandering path.

One of the objects of this invention is automatically to control the amplitude of the electrode oscillations so that the path described by the electrode is always situated between two limits formed by the edges of the two sheets or two tubes which are to be welded together.

With the mechanism according to the invention, the electrode oscillates constantly from one edge to the other of the slot in which the weld bead is deposited, even if the slot width is irregular and even if the rail supporting the self-propelled carriage is not exactly parallel to the said slot.

Although the following description will be given with reference to an electrical welding machine, the means according to the invention may also be used for controlling the amplitude of the oscillations of any oscillating tool mounted on a self-propelled carriage.

The welding head may be of any known type, e.g. an oxyacetylene torch, a fusible electrode torch, or a shrouded welding head, or an electroslag process welder.

The tool may also be a cutting tool, e.g. an oxyacetylene cutting torch or an oxygen consumable lance.

The tool may also be an inspection tool, e.g. an ultrasonic generator to check the quality of welds.

The invention covers all these applications and relates generally to automatic control of the amplitude of an oscillating tool mounted on a self-propelled carriage.

Welding machines are known which comprise a self-propelled carriage moving along a rail and supporting a welding torch which is oscillated by a reversible motor about an axis parallel to the rail. Rheostats enable the amplitude of the oscillations to be controlled and the torch to be centered. This control can be remote control carried out by an operative at a remote-control panel.

Welding machines are also known which comprise a carriage self-propelled along a rail and supporting a welding tool describing a path parallel to the rail but without oscillating. The tool may be moved laterally by a reversible motor. An automatic centering device acts on the reversible motor to keep the tool centered in the welding slot. This centering device comprises mechanical sensing means or metal body proximity detectors which follow the edges of the slot between the two sheets.

According to the present invention there is provided a self-propelled machine to support a tool describing a meandering path between the edges of two metal sheets disposed end-to-end, comprising: a self-propelled carriage movable along a rail which in operation will be secured to one of the sheets; a tool holder supported by said carriage; a reversible electric motor disposed on said carriage to oscillate the tool holder transversely relative to the rail; an electrical circuit for the reversible motor for coupling to a power source; reversing switch means in the said electrical circuit and means connected to the tool holder and oscillatable therewith to which the reversing switch means are responsive when they detect the presence of a sheet in their path to automatically control the amplitude of the tool holder oscillations to the width of the slot between the two sheets.

The means for detecting the edge of the sheet comprise, for example, a metal body proximity detector consisting of an inductance disposed in a capsule secured to the front of the tool.

In another embodiment, the means for detecting the edge of the sheet comprise one or two metal needles which are insulated from earth and which receive voltage and which are secured to the front of the tool. The current produced in a needle when it comes into contact with the edge of a sheet actuates the reversing switch means and reverses the reversible motor.

In a third embodiment, the means for detecting the edge of the sheet comprise one or two rods which are secured to the front of the tool and act as mechanical sensing means and actuate a movable electrical contact when they come into contact with the edge of a sheet, said contact actuating the said reversing switch means.

According to the invention there is further provided a butt-welding machine comprising a self-propelled carriage movable along a rail which will be secured to one of the sheets, a reversible electric motor disposed on said carriage, a welding tool holder supported by said carriage, a transmission of the crank and connecting-rod-type coupled to the reversible motor to oscillate the welding tool holder about an axis substantially parallel to the rail, an electrical circuit for the reversible motor for coupling to a power source, reversing switch means disposed in said electrical circuit, means secured to the tool holder and oscillatable therewith to which the said reversing switch means are responsive when said means in the tool holder detect a sheet in their path and which automatically control the amplitude of the welding tool holder oscillations to a slot width between the two sheets, an auxiliary carriage mounted on the self-propelled carriage which can be moved transversely of said rail by a second reversible motor, a second electrical circuit for the said second reversible motor for coupling to a power source, switch means for controlling starting of the said second reversible motor in either direction and disposed in said second electrical circuit, and means cooperating with one of the said cranks operable to actuate the said switch means in order to center the welding tool holder by keeping the axis about which it is oscillatable in the plane of symmetry of the weld.

These centering means may comprise, for example, a metal lug rigidly secured to one of the cranks and oscillating between two metal body proximity detectors disposed symmetrically in relation to the middle position of the lug and the spacing between which is variable. In an alternative embodiment, the metal lug oscillates between two needles which are insulated from earth and which receive voltage and which have adjustable spacing and which are disposed symmetrically on either side of the middle position of the lug.

In another embodiment, the automatic-centering means comprise a metal rod rigidly secured to one of the cranks and insulated from earth and receiving voltage, and two contacts having variable spacing and disposed symmetrically on either side of the position of said rod.

The advantages of automatic control of the electrode centering are that the length of the arc remains substantially constant and the quality of the weld is uniform throughout the seam.

The accompanying drawings illustrate embodiments of the invention by way of example without any limiting force.

FIG. 3 is a plan view of part of a welding machine according to the invention.

FIG. 4 is an elevation on IV–IV in FIG. 3.

Figure 1:
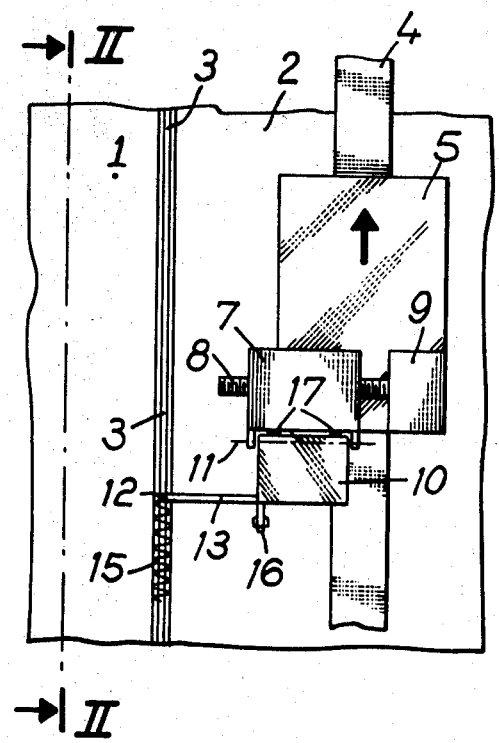
FIG. 1 is a plan view of the main components of a welding machine according to the invention.
Figure 2:
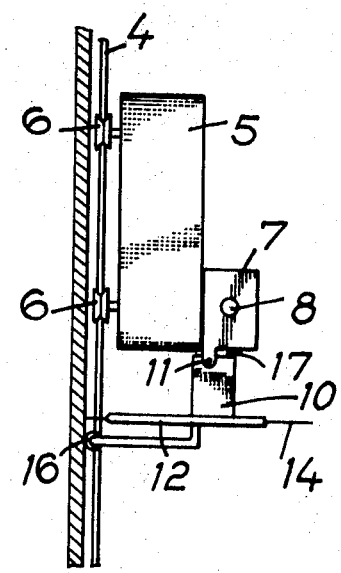
FIG. 2 is an elevation on II—II in FIG. 1.

FIGS. 1 and 2 illustrate a welding machine used for the butt-welding of two metal sheets 1 and 2. The weld bead is made in the slot 3 between the two sheets, whose edges are bevelled. A rail 4 consisting, for example, of a flat iron section is secured to the sheet 2 by any means. It is substantially parallel to the slot 3. A self-propelled carriage 5 moves along the rail and has knurled-groove rollers 6, at least one of which is a driving roller and which bear against each side of the rail. A second carriage 7, which can be moved laterally, is disposed on the carriage 5. Carriage 7 is rigidly secured to a nut which is screwed on a screw spindle 8 which is rotated by a motor 9.

A support 10 is mounted to pivot about a pivot 11. The support bears a roller 16 which runs on the sheet 2 in parallel relationship to the rail 4. Resilient buffers 17 exert a torque about the pivot 11 on the support 10, this torque counteracting the torque due to the thrust of the roller 16, so that the latter always remains in contact with the sheet 2.

An arm 13 is rigidly connected to the support 10. The torch 12 bearing the electrode 14 is disposed at the end of this arm. A mechanism illustrated in the following Figures causes the torch to oscillate transversely about a horizontal axis parallel to the slot 3. When the carriage 5 moves along the rail 4, the bottom end of the electrode describes a meandering path extending alternately from one edge of the slot 3 to the other.

Figure 5:
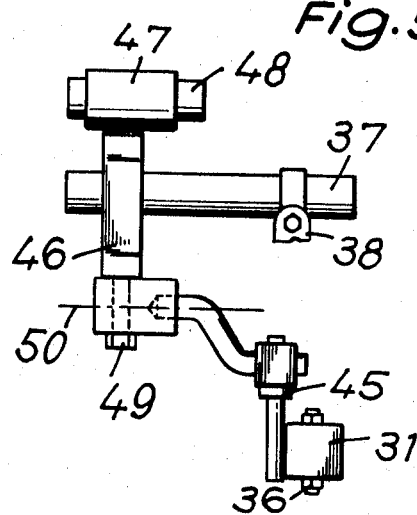
FIG. 5 is a side view on V–V of part of FIG. 3.

FIGS. 3, 4 and 5 are details of the torch-oscillating mechanism and of the means used for automatic control of the amplitude of the oscillations of the torch. FIGS. 3 to 5 show the metal sheets 1 and 2 and the slot 3 in which the weld seam is formed and the edges of which are bevelled. The rear part of the self-propelled carriage 5, the support 10 pivoting about the pivot 11, the resilient buffers 17 and the roller 16 are shown. The carriage 30, which is moved laterally by the reversible motor 9 driving the screw spindle 8, is mounted on the support 10 while in FIG. 1 the carriage 7 was mounted directly on the carriage 5.

Arm 31 forms an extension of the carriage 30 and to its end is secured a pivot 36 about which the torch 37 mounted in the support 38 oscillates.

The torch 37 is oscillated by a motor and reduction gear unit 29 disposed on the support 30. A crank 33 is secured to the drive shaft 32 coming from the reduction gear and drives a connecting rod 34 which drives a crank 35 pivotally connected to the pivot 36. The torch support 38 is supported by the crank 35 through the agency of a sliding support which enables the height of the support 38 to be adjusted by means of a screw which can be actuated by means of knob 39.

A support 45 is secured to arm 31 and bears a bent arm 20, at the bottom end of which is mounted a support 46 in the form of a loop or elongate collar in which the bottom end of the torch 37 engages. The support 46 is pivotable about the vertical pivot 50 which forms an extension of the bent support 20. It is also pivotable about a horizontal pivot in the form of a bolt 49. The support 47 is secured to the front of the support 46 and contains a capsule 48 which oscillates together with the torch.

The capsule 48 is a proximity detector for a metal body and is well-known so that there is no need to describe it in detail. The capsule 48 contains an inductance which is connected in the oscillatory circuit of an oscillator. When the capsule reaches one of the edges of the slot, the value of the inductance changes so that the frequency of the oscillations changes and a contact is actuated, e.g. a reversing switch contact disposed in the power supply circuit for the motor 29. The actuation of the reversing switch automatically reverses the motor and the torch is driven in the other direction until the detector 48 reaches the other edge of the bevel. As a result of the detector 48, the amplitude of the oscillations of the electrode 48 is always equal to the width of the slot, even if the latter has irregularities and even if the rail 4 is not exactly parallel to the slot 3. This control is automatic.

The machine includes control facilities. More particularly, the torch 37 is slidable in the collar 46 in order to vary the distance between the detector 48 and the torch and control the ratio between the amplitude of the oscillations of the torch and of the detector. The height of the detector 48 can also be controlled by sliding it in the support 47.

The machine also comprises means for automatically controlling the centering of the electrode, i.e. to maintain the axis of oscillation of the electrode 36 in the plane of symmetry of the weld so that the arc length remains substantially constant.

A lug 40 is secured to and forms an extension of the crank 33 and means 41 for detecting the proximity or contact of the lug 40 are disposed symmetrically on either side of the middle position of the lug 40. The spacing of the means 41 can be varied by any means.

In a first embodiment, the lug 40 is a metal rod and reference 41 denotes metal body proximity detector capsules. When pivot 36 is in the plane of symmetry of the weld, the lug 40 oscillates between the detectors 41 without actuating them. If there is a lateral offset of the pivot 36, the lug 40 actuates one of the detectors 41 and the latter actuates a switch which controls starting of the motor 9 in the direction to return the pivot 36 to the plane of symmetry.

In a second embodiment, reference 41 denotes studs which are sufficiently long for the lug 40 to come into contact with them. A potential difference is produced between the lug 40 and the studs 41. For example, the studs 41 are insulated from earth and voltage is applied to them and the lug 40 is conductive. Alternatively, the lug 40 consists of a needle which is insulated from earth and to which voltage is applied. As soon as the lug 40 touches one of the contacts 41 a current flows and actuates a relay which controls the starting of the motor 9 in the required direction to restore centering.

Figure 6:
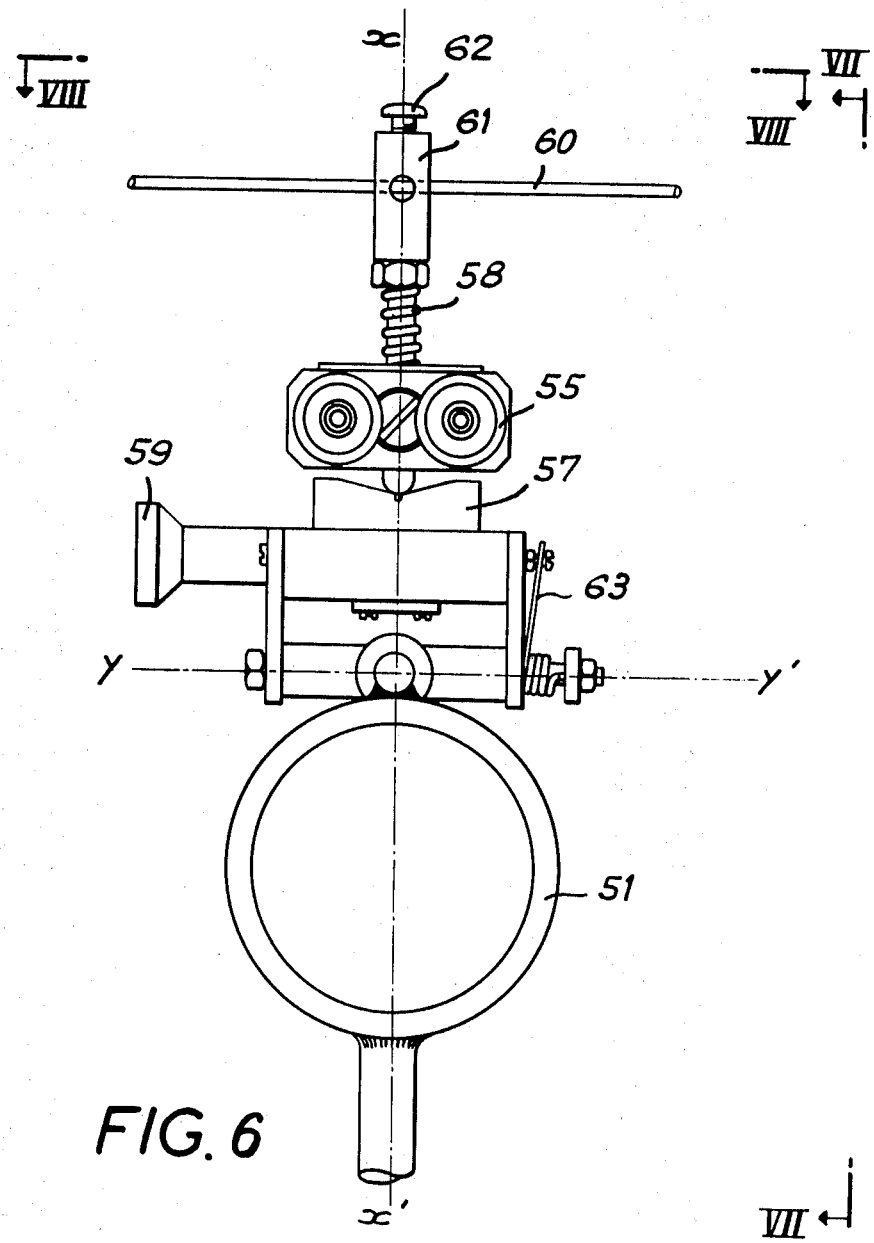
FIG. 6 is a top view of another embodiment of the means according to the invention for automatically controlling the amplitude of the oscillations of a welding electrode.
Figure 7:
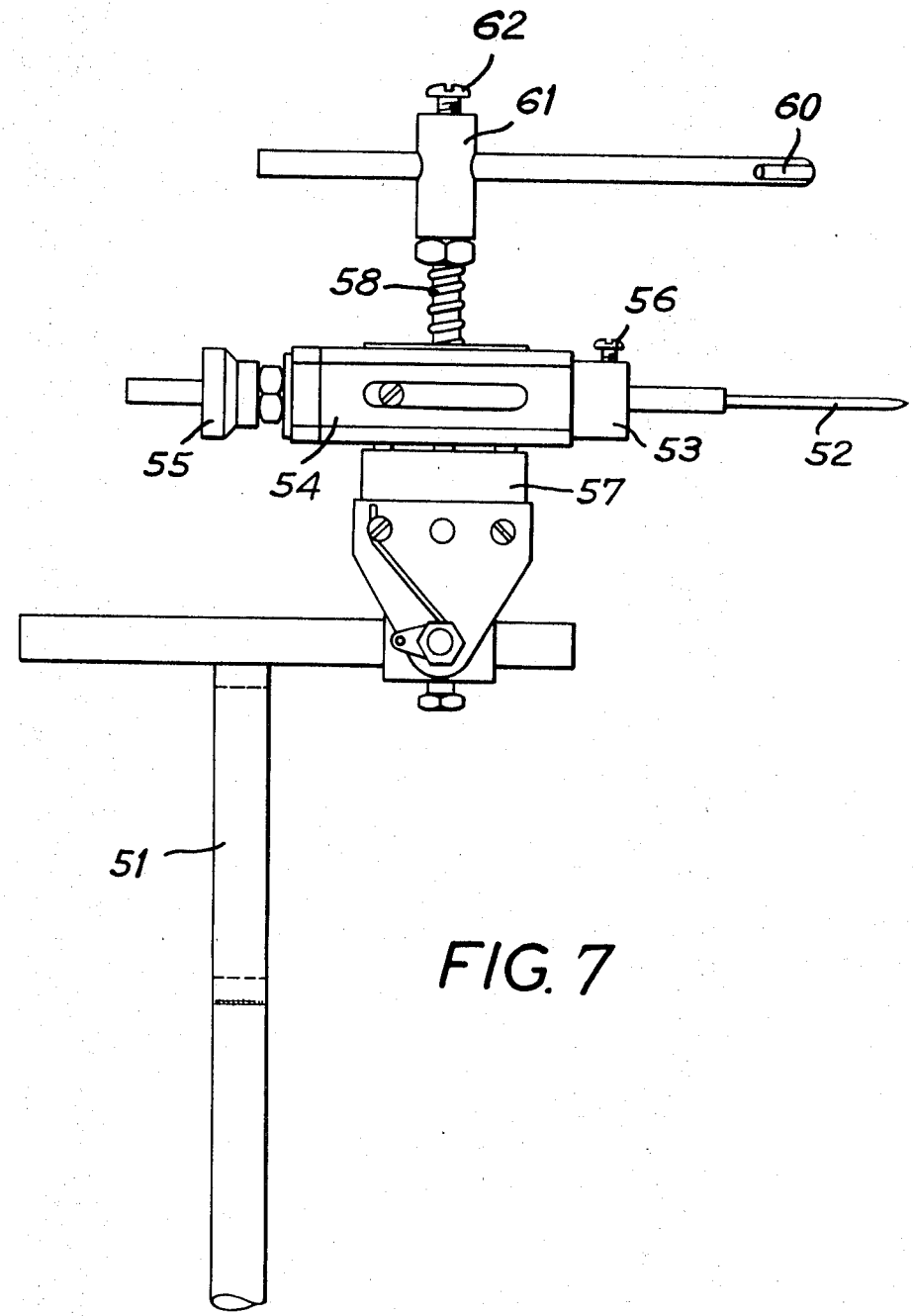
FIG. 7 is an elevation on VII–VII in FIG. 6.
Figure 8:
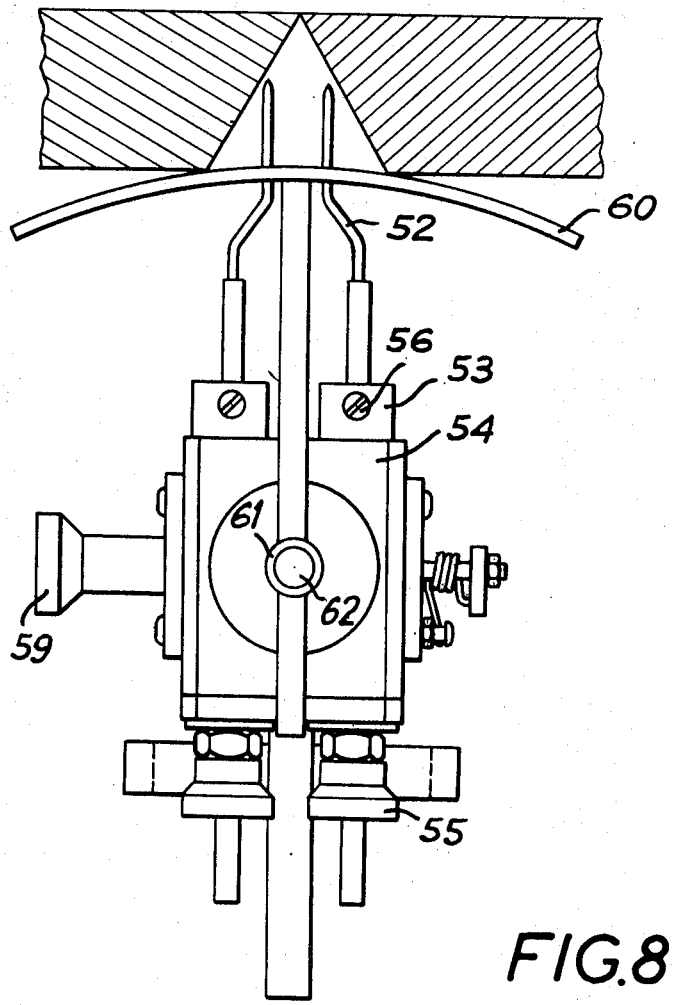
FIG. 8 is an elevation on VIII–VIII in FIG. 6.

FIG. 6, 7 and 8 illustrate a second embodiment of a welding machine according to the invention.

Reference 51 denotes the oscillating torch support, e.g. a support disposed at the end of the arm 38 in the preceding FIGS. This support oscillates about the horizontal axis $x-x'$, which is maintained by an automatic centering device in the vertical plane of symmetry of the welding slot. The axis x–x' is a continuation of the axis 36 x–the preceding FIGS.

Reference 52 denotes two rods made needles."an electrically conductive metal and referred to as "needles." These two needles are bent and secured in the supports 53. The latter are slidable in the supports 54 when the knobs 55 are rotated, so that the height of the bottom end of each needle can be adjusted.

The needles 52 are locked by the screws 56 in the supports 53. When the screws 56 are released, the needles can be pivoted and their spacing adjusted. The needle holder assembly is urged by the spring 58 against the base of the support 57 which is of V-shape and is kept centered. The support 57 is laterally movable by means of a knob 59 so that the needles can be manually centered with respect to the electrode.

A stop 60 of curved shape is disposed in contact with the metal sheet. The height of the stop is adjustable by sliding in the sleeve 61. The stop 60 is locked by the screw 62. The assembly described is pivotable about the transverse axis $y-y'$. The spring 63 exerts a torque with respect to the axis $y-y'$ and keeps the stop 60 constantly in contact with the metal sheet. The stop 60 replaces the roller 16 in the previous FIGS.

The needles 52 are insulated from earth and receive a voltage, e.g. 24 volts. The needles oscillate transversely together with the tool support 51. As soon as one of the needles comes into contact with the edge of the sheet situated on its side, a current flows in that needle. This current actuates a relay which reverses the motor driving the support 51 in an oscillatory movement. The amplitude of the electrode oscillations is thus controlled automatically and corresponds exactly to the slot width. The apparatus has manual control facilities for adjustments before stating. For example, the height and spacing of the needle points are adjusted manually.

In a variant, reference 52 denotes rods which pivot about horizontal axes parallel to the weld seam and which continue beyond this axis in the form of a movable contact. When a rod comes into contact with an edge of the sheet it pivots and the contact opens. Breaking of the current actuates a relay which reverses the direction of the oscillation-producing motor.

The advantage of this variant is that the movable contact consists of two studs between which current readily flows, while contact between the end of a live needle and the metal sheet may be poor if the latter is dirty.

I claim:

1. A self-propelled machine to support a tool describing a meandering path along a slot between the edges of two metal sheets disposed end-to-end, comprising: a self-propelled carriage movable along a rail secured to one of the sheets and parallel to said slot; a tool holder supported by said carriage; a reversible electric motor disposed on said carriage; transmission means connecting said motor and tool holder to oscillate the tool holder transversely relative to said slot; an electrical circuit coupled to said reversible motor and adapted for connection to a power source for energizing said motor; reversing switch means in said electrical circuit; and sheet-edge-detecting means connected to the tool holder for oscillation therewith and connected to actuate the reversing switch means for reversing the direction of rotation of said motor to vary the magnitude of tool holder oscillation in response to varying positions of the sheet edges as the carriage moves along the slot; and centering means moving said tool holder laterally of said slot for maintaining the center of oscillation at the center of the slot.

2. A machine according to claim 1, wherein the detecting means comprising at least one metal body proximity detector consisting of an inductance disposed in a capsule secured to the tool holder.

3. A machine according to claim 1, wherein the detecting means comprise at least one conductive needle insulated from earth and coupled to said circuit to receive a voltage in operation and which is secured to the tool holder.

4. A machine according to claim 3, wherein the detecting means comprise two pivotable conductive needles normally parallel to the tool axis and slidable in the direction parallel to the tool axis.

5. A machine according to claim 1, wherein the detecting means comprise at least one rod secured to the tool holder and movable to actuate an electrical contact when encountering a sheet.

6. A butt-welding machine comprising a self-propelled carriage movable along a rail adapted to be secured to one of two adjacent sheets, a reversible electric motor disposed on said carriage, a welding tool holder supported by said carriage, a transmission of the crank and connecting rod type coupled to the reversible motor to oscillate the welding tool holder about an axis substantially parallel to the rail, an electrical circuit connected to the reversible motor for coupling the motor to a power source, reversing switch means disposed in said electrical circuit, sheet-edge-detecting means secured to the tool holder and oscillatable therewith to operate said reversing switch means upon detection of a sheet edge to automatically control the amplitude of the welding tool holder oscillations to a slot width between the two sheets, an auxiliary carriage mounted on the self-propelled carriage for movement transversely of said rail by a second reversible motor, a second electrical circuit for said second reversible motor for coupling the motor to a power source, switch means for controlling starting of the said second reversible motor in either direction and disposed in said second electrical circuit, and crank-throw-detection means mounted adjacent one of the said cranks to actuate said switch means upon crank excursion beyond a predetermined amount to operate said second motor for movement of said auxiliary carriage in order to center the welding tool holder by keeping the axis about which it is oscillatable in the plane of symmetry of the weld.

7. A welding machine according to claim 6, wherein one of said cranks has a metal lug rigidly secured thereto and said crank-throw-detection means comprises two metal body proximity detectors of adjustable spacing disposed symmetrically on either side of the middle position of the oscillating lug.

8. A welding machine according to claim 6 further comprising a metal rod which is insulated from earth and to which voltage is applied in operation, the rod being connected to one of the cranks of said transmission, and said crank-throw-detection means including two contacts which have variable spacing and are disposed symmetrically on either side of the middle position of the said rod.

9. A welding machine according to claim 6 further comprising a metal lug rigidly secured to one of the cranks of the said transmission and said crank-throw-detection means including two adjustably spaced needles from earth and receive voltage and have adjustable spacing and are disposed symmetrically on either side of the middle position of said metal lug and have a voltage applied thereto for causing a current to flow upon contact of said lug with either needle.

* * * * *